United States Patent [19]

Strait

[11] Patent Number: 5,482,550

[45] Date of Patent: Jan. 9, 1996

[54] STRUCTURAL BUILDING UNIT AND METHOD OF MAKING THE SAME

[76] Inventor: Mark C. Strait, 1296 Patricia Ave., Simi Valley, Calif. 93065

[21] Appl. No.: 348,845

[22] Filed: Nov. 28, 1994

Related U.S. Application Data

[63] Continuation-in-part of Ser. No. 813,713, Dec. 27, 1991, abandoned.

[51] Int. Cl.$^6$ .......................... C04B 16/02; C04B 16/08; C04B 38/00
[52] U.S. Cl. .......................... 106/677; 106/679; 106/681; 106/705; 106/706; 106/711; 106/697; 106/719; 106/724; 106/737; 106/DIG. 1; 106/DIG. 4; 106/823; 52/DIG. 9
[58] Field of Search ...................................... 106/672, 677, 106/679, 681, 705, 706, 711, 697, 718, 719, 724, 737, DIG. 1, DIG. 4, 823; 52/DIG. 9

[56] References Cited

U.S. PATENT DOCUMENTS

| | | | |
|---|---|---|---|
| 3,963,506 | 6/1976 | Shutt et al. | 501/131 |
| 4,047,962 | 9/1977 | Copeland | 106/DIG. 1 |
| 4,588,443 | 5/1986 | Bache | 106/672 |
| 4,905,439 | 3/1990 | Filteau | 106/672 |
| 5,108,679 | 4/1992 | Rirsch et al. | 106/711 |

OTHER PUBLICATIONS

Kosmatka et al., "Design & Control of Concrete Mixtures", Thirteenth edition, PCA, 1988, p. 64.

*Primary Examiner*—Mark L. Bell
*Assistant Examiner*—Michael Marcheschi

[57] ABSTRACT

The present application is directed to a structural building unit formed from a set solid mixture consisting essentially of about 30% to about 75% by weight portland cement, about 1% to about 25% by weight percent ground expanded cellular polystyrene, about 1% to about 35% by weight ground cellulosic fiber, about 2% to about 15% by weight fly ash, about 1% to about 10% by weight silica fume, about 1% to about 15% by weight bentonite, about 25% to about 50% by weight water, about 0% to about 3% by weight air entrainer, about 0% to about 10% by weight paraffin wax emulsion and about 0% to about 15% by weight rubber emulsion.

4 Claims, No Drawings

STRUCTURAL BUILDING UNIT AND METHOD OF MAKING THE SAME

BACKGROUND OF THE INVENTION

This application is a continuation-in-part of U.S. patent application Ser. No. 07/813,713 filed on Dec. 27, 1991 now abandoned.

FIELD OF THE INVENTION

This invention relates generally to structural building elements and methods for the fabrication thereof. In particular, this invention relates to solid, lightweight, cementitious structural building elements formed from a set solid mixture comprising ground expanded cellular polystyrene, ground cellulosic fiber, and cement. This invention satisfies a long felt need for an extraordinarily low density roofing material which exhibits superior flexural and compressive strength, while maintaining a high resistance to water absorption. In its preferred embodiment, the use of expanded cellular polystyrene and cellulosic material derived from recycled sources promotes the health of our environment and considerably reduces the cost of finished building units.

PRIOR ART

Many of those knowledgeable in the art have recognized the utility of structural building elements fabricated from set solid cementitious mixtures containing filler of one type or another. Typically less expensive than analogous elements comprised of more conventional building materials (e.g., wood, steel, or concrete), structural elements cast, extruded, or otherwise molded from such set solid cementitious mixtures are often acceptably durable as well. Unfortunately, no single set solid cementitious mixture appears to offer the best alternative to more conventional building materials in all applications. For example, Shutt et al (U.S. Pat. No. 3,963,506) and Bache (U.S. Pat. No. 4,588,443) describe formulations which, though they may yield structural building elements possessing exceptionally high compression strength, would, by today's standard, be precluded from use as roofing materials by virtue of their high densities (i.e., they are simply too heavy). This is understandable, however, since neither Shutt et al nor Bache apparently set out to develop materials for this application. In each case, these gentlemen describe the preparation of "building blocks" or "building bricks".

Although the formulations described by Copeland (U.S. Pat. No. 4,047,962) do appear to exhibit flexural strengths and densities comparable to those of the present invention, none exhibit comparable compression strengths. So too, do none of Filteau's formulations (U.S. Pat. No. 4,905,439) yield structural building elements of comparable compression strength.

While Rirsch et al (U.S. Pat. No. 5,108,679) teach the use of formulations which exhibit exceptionally high flexural strengths, no compression strengths or densities are cited. This is particularly curious since Rirsch et al state that their invention relates to the production of "lightweight impact resistant roofing products". Despite this description, it is unlikely that such tiles are as lightweight as those described in the present application. In the absence of quantitative data to the contrary, this conclusion is based upon two important considerations. The first is the extraordinarily high impact resistance of these materials. The second is the fact that such tiles apparently contain a mixture of both lightweight and non-lightweight aggregate (i.e., stone or shale). It is unlikely that such tiles could contain such materials in appreciable concentration whilst exhibiting lower bulk densities than those containing no such materials. Having actually examined Redland tiles of this type, it has been the experience of this applicant that comparing the density of such tiles to the density of those described in the present application would be similar to comparing tiles composed of oak to those composed of balsa wood.

In short, none of the formulations described by Rirsch (et al) in U.S. Pat. No. 5,108,679, by Filteau in U.S. Pat. No. 4,905,439, by Bache in U.S. Pat. No. 4,588,443, by Copeland in U.S. Pat. No. 4,047,962, or by Shutt (et al) in U.S. Pat. No. 3,963,506 offer the same high compression strength in conjunction with the same high flexural strength in conjunction with the same low density.

Data presented in the following table (Table I) compares the density, compression strength, and flexural strength of structural elements described in the present application to those described by Rirsch (et al) in U.S. Pat. No. 5,108,679, by Filteau in U.S. Pat. No. 4,905,439, by Bache in U.S. Pat. No. 4,588,443, by Copeland in U.S. Pat. No. 4,047,962, and by Shutt (et al) in U.S. Pat. 3,963,506.

TABLE I

|  | Density (g/cc) | Compression Strength (psi) | Flexural Strength (psi) | Citation |
|---|---|---|---|---|
| Rirsch, et al |  |  |  |  |
| Ex. 1 | not mentioned | not mentioned | 1,915 | 13.2 MPa; Table 2, U.S. Pat. No. 5,108,679 |
| Ex. 2 | not mentioned | not mentioned | 2,190 | 15.1 MPa; Table 2, U.S. Pat. No. 5,108,679 |
| Ex. 3 | not mentioned | not mentioned | 2,393 | 16.5 MPa; Table 2, U.S. Pat. No. 5,108,679 |
| Ex. 4 | not mentioned | not mentioned | 928 | 6.4 MPa; Table 3, U.S. Pat. No. 5,108,679 |
| Ex. 5 | not mentioned | not mentioned | 1,204 | 8.3 MPa; Table 3, U.S. Pat. No. 5,108,679 |
| Ex. 6 | not mentioned | not mentioned | 1,349 | 9.3 MPa; Table 3, U.S. Pat. No. 5,108,679 |
| Filteau |  |  |  |  |
| Ex. 1 | not mentioned | 409 | not mentioned | 2.82 MPa; line 9, column 8, U.S. Pat. No. 4,905,439 |
| Ex. 2 | not mentioned | 379 | not mentioned | 2.61 MPa; line 19, column 8, U.S. Pat. No. 4,905,439 |
| Ex. 3 | not mentioned | 251 | not mentioned | 1.73 MPa; line 31, column 8, U.S. Pat. No. 4,905,439 |
| Ex. 4 | not mentioned | 87 | not mentioned | 0.60 MPa; line 41, column 8, U.S. Pat. No. 4,905,439 |

TABLE I-continued

|  | Density (g/cc) | Compression Strength (psi) | Flexural Strength (psi) | Citation |
|---|---|---|---|---|
| Ex. 5 a | not mentioned | 693 | not mentioned | 155.3 kN; line 18, column 9, U.S. Pat. No. 4,905,439 |
| Ex. 5 b | not mentioned | 617 | not mentioned | 139.2 kN; line 23, column 9, U.S. Pat. No. 4,905,439 |
| Ex. 6 a | not mentioned | 864 | not mentioned | 193.7 kN; line 41, column 9, U.S. Pat. No. 4,905,439 |
| Ex. 6 b | not mentioned | 707 | not mentioned | 158.5 kN; line 46, column 9, U.S. Pat. No. 4,905,439 |
| Bache, et al |  |  |  |  |
| Ex. 1 | 2.878 | 31,550 | not mentioned | 217.5 MPa; Table 1, U.S. Pat. No. 94,588,443 |
| Ex. 2 |  |  |  | Not applicable |
| Ex. 3 |  |  |  | Not applicable |
| Ex. 4 | 2.853 | 35,970 | not mentioned | 248.0 MPa; Table 4, U.S. Pat. No. 4,588,443 |
| Ex. 5 | 2.857 | 38,910 | not mentioned | 268.3 MPa; Table 5, U.S. Pat. No. 4,588,443 |
| Ex. 6 |  |  |  | Not applicable |
| Copeland |  |  |  |  |
| Ex. 1 | 1.089 (dry) 1.458 (wet) |  |  | Lines 22–25, column 6, U.S. Pat. No. 4,047,962 |
| Ex. 2 |  | 250 (2-hour) 650 (7-day) 1,000 (28-day) |  | Lines 28–30, column 6, U.S. Pat. No. 4,047,962 (essentially the same formulation as in Ex. 1) |
| Ex. 3 |  |  |  | Not applicable |
| Ex. 4 |  | 250 (2-hour) 650 (7-day) 1,000 (28-day) | 296 | Average, Table IV, U.S. Pat. No. 4,047,962 (essentially the same formulation as in Ex. 1) |
| Ex. 5 |  |  |  | Not applicable |
| Ex. 6 |  |  |  | Not applicable |
| Ex. 7 |  |  |  | Not applicable |
| Ex. 8 |  |  |  | Not applicable |
| Ex. 9 |  | 250 (2-hour) 650 (7-day) 1,000 (28-day) | 340 | Line 56, column 9, U.S. Pat. No. 4,047,962 (essentially the same formulation as in Ex. 1) |
| Shutt, et al |  |  |  |  |
| Ex. 1 | 1.922 | 5865 | 837 | Lines 33–35, column 5, U.S. Pat. No. 3,963,506 & Table, column 6, U.S. Pat. No. 3,963,506 |
| Ex. 2 | 1.922 | 13,500 | 1,505 | Lines 33–35, column 5, U.S. Pat. No. 3,963,506 & Table, column 6, U.S. Pat. No. 3,963,506 |
| Ex. 3 | 1.922 | 11,170 | 1,944 | Lines 33–35, column 5, U.S. Pat. No. 3,963,506 & Table, column 6, U.S. Pat. No. 3,963,506 |
| Strait |  |  |  |  |
| Test #37 - Series II | 1.324 | 878 (7-day) | 186 (7-day) |  |
| Test #39 - Series II | 1.350 | 1145 (7-day) | 205 (7-day) |  |
| Test #40 - Series II | 1.331 | 1096 (7-day) | 204 (7-day) |  |
| Test #41 - Series II | 1.331 | 1128 (7-day) | 198 (7-day) |  |
| Test #42 - Series III | 1.600 |  | 211 (7-day) 324 (28-day) |  |
| Test #43 - Series III | 1.379 | not measured | 198 (7-day) 299 (28-day) |  |
| Test #44 - Series III | 1.369 | not measured | 210 (7-day) 306 (28-day) |  |
| Test #45 - Series III | 1.235 | not measured | 158 (7-day) 258 (28-day) |  |
| Test #54 - Series IV | 1.327 | 1483 (28-day) | 211 (28-day) |  |
| Test #55 - Series IV | 1.401 | 1315 (28-day) | 198 (28-day) |  |
| Test #68 - Series VI | 1.298 | 2762 (7-day) | 262 (7-day) |  |
| Test #69 - Series VI | 1.299 | 2731 (7-day) | 284 (7-day) |  |
| Test #70 - Series VI | 1.310 | 2040 (7-day) | 237 (7-day) |  |
| Test #71 - Series VI | 1.289 | 3095 (7-day) | 297 (7-day) |  |
| Test #72 - Series VI | 1.289 | 3209 (7-day) | 318 (7-day) |  |
| Test #73 - Series VI | 1.301 | 2294 (7-day) | 263 (7-day) |  |

SUMMARY OF THE INVENTION

The improved structural building elements of the present invention are solid, lightweight, cementitious units formed from a set solid mixture comprising ground expanded cellular polystyrene, ground cellulosic fiber, and cement, the improvement comprising reduced density and improved flexural strength resulting from the use of about 1% to about 25% by weight of recycled Styrofoam which has been ground so finely as to yield a material wherein a single, broad, and continuous size distribution of fractured cellular particles is homogeneously distributed throughout the bulk to increase air entrainment capacity and provide for a plurality of smaller, more uniform air pockets therein.

The use of recycled Styrofoam which has been ground so finely as to yield a material wherein a single, broad, and continuous size distribution of fractured cellular particles is homogeneously distributed throughout the bulk to increase air entrainment capacity and provide for a plurality of smaller, more uniform air pockets therein, constitutes the following innovations:

1) How recycled Styrofoam is handled prior to incorporation into set solid cementitious mixtures for the preparation of structural building elements; especially roofing tiles and/or shingles.
2) How said recycled Styrofoam is incorporated through the use of styrene-butadiene or rubber emulsion into set solid cementitious mixtures for the preparation of structural building elements; especially roofing tiles and/or shingles.
3) How resultant structural elements prepared in this fashion exhibit unexpectedly high compression and flexural strength whilst also exhibiting extremely low bulk density.

In U.S. Pat. No. 3,963,506, Shutt et al teach the use of ". . . waste or broken soda lime glass which had been theretofore first used in another fashion such as a container or the like." (lines 67–68, column 1 through lines 1–2, column 2, U.S. Pat. No. 3,963,506). No where in U.S. Pat. No. 3,963,506 do Shutt et al describe the use of expanded cellular material comprised in whole or in part of recycled Styrofoam. In fact, such materials are expressly excluded from use by Shutt et al under U.S. Pat. No. 3,962,506 wherein on lines 52–59 of column 2, it is stated that . . .

"The aggregate or inorganic filler component of the structural clay product has ecological ramifications in that is may comprise waste material which is otherwise useless or not disposable. All that is required is that it will not melt, decompose, or disintegrate below the low firing temperature utilized to fire the composition and that its coefficient of thermal expansion does not vary greatly from that of soda lime glass."

Recycled Styrofoam is comprised primarily of polystyrene. Polystyrene is a polymeric material which would melt and certainly burn upon exposure to the "low" firing temperatures described by Shutt et al. In their first and second examples, Shutt et al cite a firing temperature of 1700° F. (926.7° C.). In their third example, Shutt et al cite a firing temperature of 1450° F. (787.8° C.). None of these temperatures is low enough to permit the use of Styrofoam or any other common polymeric material. This is true whether such material has been recycled or not. The use of such materials as described in the present application is permissible in light of the relatively low drying temperatures employed.

It is clear that Shutt et al teach the use of a recycled material (i.e., soda lime glass) capable of increasing the density and reducing the porosity of resultant structural elements. Conversely, recycled Styrofoam is utilized in the present invention to decrease the density and increase the porosity of the claimed structural elements.

It is unlikely that Shutt et al would have ever considered the use of an expanded cellular material such as polystyrene or recycled Styrofoam to effect the properties desired in their structural units. Nevertheless, Shutt et al were granted a patent for the use of "waste" or "recycled" soda-lime glass (claim 3 of U.S. Pat. No. 3,963,506). Given this, the present applicant respectfully submits that the use of recycled Styrofoam clearly constitutes a unique and innovative use of recycled Styrofoam that should certainly be patentable over Shutt et al in light of the above distinctions. Those "knowledgeable in the art" as described by Shutt et al would have had no reason to consider the use of such materials and would not have achieved the results they desired if they had.

While Copeland, in U.S. Pat. No. 4,047,962 teaches the use of formulations which do indeed include an "expanded cellular material" (line 46, column 2, U.S. Pat. No. 4,047,962), the specifications for such material as well as the reasons for its inclusion can be readily differentiated from those described in the present application. Furthermore, Copeland makes no mention of the use of "recycled" Styrofoam which has "been ground so finely as to yield a material wherein a single, broad, and continuous size distribution of fractured cellular particles is homogeneously distributed throughout the bulk to increase air entrainment capacity and provide for a plurality of smaller, more uniform air pockets therein" as an appropriate substitute for "expanded styrene or polystyrene beads" (lines 23–24, column 3, U.S. Pat. No. 4,047,962).

Copeland teaches the use of "expanded styrene or polystyrene beads" as a means of improving the insulative properties of his structural elements. In line 45 of column 3 (U.S. Pat. No. 4,047,962), it is the inclusion of gypsum rather than any expanded material that Copeland cites as responsible for the strength of his material. Specifically with regard to the use of expanded styrene and polystyrene beads, Copeland cites the use of such materials in the form of "expanded granules which are relatively soft and are of average size sufficient to pass a 20 mesh screen" (lines 26–29, column 3, U.S. Pat. No. 4,047,962). Particles sufficiently small to pass through a 20 mesh screen means merely that they are smaller than 0.841 mm. This says nothing about how such materials might be preprocessed, whether such materials might be prepared from recycled materials, or how the size distribution of such materials might be controlled to effect optimum performance of the finished product. More specifically, Copeland fails to recognize how the use of such materials, when properly classified, contributes to the compression and flexural strength of resultant structural elements above and beyond their contribution to such an element's insulative properties.

In short, Copeland teaches the use of "expanded styrene or polystyrene beads" as filler specifically included to improve his composite's insulative properties. The present applicant respectfully submits that had Copeland or others "knowledgeable in the art" recognized how the strength of such structural elements might be improved through the use of such expanded cellular material when properly ground and classified (i.e., "ground so finely as to yield a material wherein a single, broad, and continuous size distribution of fractured cellular particles is homogeneously distributed throughout the bulk to increase air entrainment capacity and provide for a plurality of smaller more uniform air pockets therein"), the materials comprising his "examples" would have exhibited much higher compression strengths. In his first example, Copeland cites a 7 day compression strength of only 650 psi. Materials prepared according to the teachings of the present applicant exhibit 7 day compression strengths ranging from 1,096 psi to 3,209 psi.

In the applicants experience, equivalent strengths are unattainable despite the use of gypsum and "gypsum-like" materials when the expanded polystyrene or recycled Styrofoam is utilized as intact beads or particles of unspecified or just grossly classified particle size distributions. Intact beads, even when soft or flexible yield an undesirable diversity in the size of air pockets throughout the bulk composite material. After grinding, the cellular nature of such material is destroyed yielding a material, the porosity of which, depends more upon its microporosity rather than is bulk structure.

It is worth noting further that in section b of claim 1 (U.S. Pat. No. 4,047,962) Copeland teaches the use of expanded cellular material which is added to the mixture from which his structural units are derived in a proportion ranging from 9% –29% by volume. This suggests a much larger volume percent, but a much smaller weight percent than is specified in claim 1 of the present application.

While Filteau teaches the use of an expanded cellular material, so too does this material differ substantively in both its physical nature and utility. In U.S. Pat. No. 4,905,439, Filteau describes the use of an expanded cellular material which is described as being comprised of "three approximately equal particle size distribution ranges to provide expanded strength characteristics" (Abstract, U.S. Pat. No. 4,905,439). Here again, this applicant is compelled to emphasis that the expanded cellular material has been "ground so finely as to yield a material wherein a single, broad, and continuous size distribution of fractured cellular particles is homogeneously distributed throughout the bulk to increase air entrainment capacity and provide for a plurality of smaller more uniform air pockets therein". The grinding process of the present application is critical since it fractures what would otherwise be the intact particles of said expanded cellular material and it provides for a monomodal rather than trimodal particle size distribution. That such an innovation does not merely constitutes the practice of one knowledgeable in the art would seem fairly clear in light of the attention Filteau apparently gives to modifying the particle size distribution of his expanded cellular material without realizing that a truly optimum material might be obtained through fracturing the cellular structure rather than blending material which has three different particle size distributions in some particular proportion. It would also seem to be worth noting that the particles of which Filteau's expanded material is comprised are roughly three to six times larger (i.e., 1.25 mm–3.00 mm) than those to which the present applicant refers (i.e., average particle size after grinding is about 0.5 mm).

In the applicant's experience, the approach of Filteau is a fairly common approach to circumventing the problems associated with the use of intact beads or particles which must be combined in various proportions so as to simulate, but never actually duplicate, the single broad distribution of particle size of the present application. This is important because the size of pores and how they are distributed throughout the bulk of the finished product will also affect its freeze-thaw characteristics (i.e., smaller pores distributed more homogeneously throughout the bulk are preferred to larger pores distributed less homogeneously throughout the bulk even though their the effect on bulk density might be equivalent). The use of larger intact polystyrene beads can lead to a broader distribution of pore sizes. To some extent this can be avoided by using intact particles of multimodal size distribution, but the best results will always be obtained with fractured cellular particles.

In still further support of the applicant's claim that both his expanded cellular material and its use constitutes a bona fide innovation, consider lines 24–28 in column 9 of U.S. Pat. No. 4,905,439. In said passage, Filteau states that "by maintaining all other ingredients and procedures constant, only a minor variance of over 10% in one range of particle size distribution outside the range of this invention results in inferior compression strengths." Given the single, broad, distribution of particle sizes described in the present application, it is unlikely that Filteau had conceived or reduced to practice any procedure whereby a material such as that disclosed by the present applicant could be used to simultaneous effect improved strength with high flexural strength in a structural building elements of lower bulk density. In fact, the preferred embodiment of Filteau's invention strongly suggests that density was not one of his primary considerations at all.

In the present invention further improvement in strength, flexibility, and resistance to breakage is achieved wherein the ground cellulosic fiber mentioned above is obtained from recycled material which has been graded by fiber length into three discrete categories referred to as short, medium, and long, combined in various proportions ranging from about 50% to about 100% by weight long, about 0% to about 30% by weight medium, and about 0% to about 30% by weight short, and incorporated into the set solid cementitious mixture in proportion ranging from about 1% to about 35% by weight.

In U.S. Pat. No. 3,963,506, Shutt et al teach the use of ". . . waste or broken soda lime glass which had been theretofore first used in another fashion such as a container or the like." (lines 67–68, column 1 through lines 1– 2, column 2, U.S. Pat. No. 3,963,506). No where in U.S. Pat. No. 3,963,506 does Shutt describe the use of cellulosic fibers. In fact, such materials are expressly excluded from use by Shutt et al under U.S. Pat. No. 3,962,506 wherein on lines 52–59 of column 2, it is stated that . . .

"The aggregate or inorganic filler component of the structural clay product has ecological ramifications in that is may comprise waste material which is otherwise useless or not disposable. All that is required is that it will not melt, decompose, or disintegrate below the low firing temperature utilized to fire the composition and that its coefficient of thermal expansion does not vary greatly from that of soda lime glass."

The "low firing temperature" mention by Shutt is specified as between 1300° F. and 1850° F. in line 52 of column 3 (U.S. Pat. No. 3,963,506). In Shutt's first and second examples a firing temperature of 1700° F. is cited. In Shutt's third example a firing temperature of 1450° F. is cited. Cellulosic fibers would decompose (i.e., burn) well below even the minimum firing temperatures described by Shutt et al. Furthermore, the nature of recycled cellulosic fiber is inconsistent with Shutt's very definition of "recycled material". Cellulosic fiber is not "otherwise useless or not disposable."

Copeland teaches the use of cellulosic fiber which is added to the composite mixture "in the form of sawdust or chips not exceeding about seven eighths of an inch in diameter" (lines 40–43, column 3, U.S. Pat. No. 4,047,962). In the present application, the cellulosic fiber is more carefully selected and added as a collection of fibers having essentially a trimodal distribution of lengths. In the applicant's experience, the use of raw wood fibers or the use of saw dust imparted deleterious effects on both the flexural strength and aesthetic appearance of the finished product in the former case and on the both the finished product's density and propensity to absorb moisture in the later case. The present applicant has found that most natural wood products (i.e., wood chips or sawdust) contain lignins which weaken subsequently cast structural elements via "concrete retardation". By using cellulosic fiber, this problem can be completely avoided. That Copeland recognized these disadvantages or that he recognized the improvements in strength which could derived from utilizing cellulosic fiber that had been more carefully and/or selectively preprocessed is unlikely since he refers repeatedly to how the "high density" formulations he describes offer improved strength and how the use of fibrous material actually aid in moisture retention. When such set solid materials are used to cast roofing tiles, moisture retention is undesirable as it contributes unnecessarily to the weight of the finished product. The same can be said of formulations designed to yield finished products of higher density.

That the present application demonstrates how such fibrous material might be incorporated into light weight (i.e., low density) structural building elements without the need to worry about the increased propensity of such units for the absorption of moisture constitutes an irrefutable innovation over the teachings of Copeland. It is also worth noting that Copeland describes formulations to which a volume percentage of fibrous material ranging from 8% to 28% is added. The recommended concentration of fibrous material covers a much broader range (1–35% by weight) which includes formulations possessing far more fibrous material than those described by Copeland.

Filteau makes no mention whatsoever of the use of fibrous cellulosic materials which may certainly suggest that by 1990, the use of such materials as prescribed by Copeland had all but been abandoned consequent to the inability of those "knowledgeable in the art" to perfect a pre-processing technique whereby such materials might be added to such formulations without inducing the deleterious side-effects described above.

In U.S. Pat. No. 5,108,679, Rirsch et al suggest the use of fibrous material which may include cellulosic fiber, but it should be noted that among the disadvantages associated with the use of such fibrous materials, Rirsch et al specifically cite how difficult it can be to process materials when higher concentrations of fibrous materials are included (lines 1–5, column 3, U.S. Pat. No. 5,108,679). That this remains a concern to those considered knowledgeable in the art is evidenced by the fact that Rirsch et al teach the use of only 0.15%–4% by weight of such fibers (lines 56–57, column 4, U.S. Pat. No. 5,108,679). In the present application recycled cellulosic fiber is incorporated, again after careful preprocessing, at a level ranging between 1% and 35% by weight. The ability to increase the strength of resultant structural elements through the addition of much higher concentrations of cellulosic fibers constitutes a bona fide innovation over the techniques described in the prior art. In this applicant's experience, the addition of higher concentrations of cellulosic fiber into the set solid mixture(s) is greatly facilitated by the classification and subsequent addition of fibers having a trimodal distribution of lengths.

So too does Bache mention the use of fibers, but no specific information as to how the pre-treatment (i.e. classification and subsequent recombination in specified length distribution) might provide a method for overcoming the problems described by Rirsch yet clearly overcome in the present application.

So careful has this applicant's attempt to use only the highest quality recycled fibrous material been, that he has devoted considerable time and attention to comparing the quality of results obtained with such material obtained from different sources. To this end, the applicant has discovered that best results are usually obtained when such fibers are obtained from high quality paper products such as computer printout.

In the present invention, further improvement in strength is achieved through the use of a rubber emulsion as an additional component of the set solid mixture or mixtures described above in this application.

Neither Rirsch et al, nor Filteau, nor Bache, nor Copeland, nor Shutt et al, nor Kosmatka et al teach the use of such a rubber emulsion for improving the strength of their structural elements. Such a material would not be suitable in applications such as those described by Shutt et al in which resultant structural units must be fired at high temperatures. Kosmatka et al describe the use of soaps, calcium, ammonia stearate, ammonia oleate, butyl stearate, and petroleum products (oils and greases) for the purpose of "damp proofing admixtures". No mention of a rubber emulsion is made. So too does Copeland fail to mention the use of any such material. Filteau mentions the use of "various chemical additives known to those skilled in this art" (U.S. Pat. No. 4,905,439, column 5, lines 18–19), but never makes any specific mention of any such materials and clearly suggests that the nature of such materials, when added, would serve only to facilitate mixing rather than to improve the strength of subsequently cast structural elements by acting as a binder between the cement and the cellulosic fiber.

While Bache mentions the use of a plasticizer in U.S. Pat. No. 5,108,679, the distinction between such plasticizers and a rubber emulsion is worth noting. Plasticizers are typically added as a means of reducing the amount of water required to render cementitious mixtures more "workable". In this applicant's experience, however, this also tends to increase the density of structural elements cast from such mixtures. Consequently, plasticizers are not used in the cementitious mixtures from which structural elements described in the present application are derived.

Further improvements in the present invention are derived from the use of a paraffin wax emulsion as an additional component of the set solid mixture described above.

Here again no mention of paraffin wax (more specifically, a paraffin wax emulsion) is made by Rirsch et al Filteau, Bache, Copeland, Shutt et al, or Kosmatka et al. One possible reason for this is that even if one of them had recognized the potential advantages of such a material, they would not have been able to incorporate it readily in the kinds of mixtures described in the present application. Wax and water don't mix well. By introducing this material in the form of an emulsion, it is possible to insure its homogeneous distribution throughout the material. Once cured or dried, such materials act to prevent the subsequent adsorption of water.

In the present invention, structural building elements cast or molded from the set solid cementitious mixtures described here are dried at low temperature and over shorter periods of time than dictated by those knowledgeable in the state of the art.

In the prior art cited, only in U.S. Pat. No. 3,963,506 do the inventors disclose the specific conditions under which their claimed structural units are cured or dried. There, Shutt et al describe several methods for "firing" said structural elements at high temperature. As this is clearly inapplicable to the structural elements cited in the present application and since the method cited by the present applicant is believed to be responsible for the increased structural integrity, dimensional uniformity, and reduced (yet stable) water content, the applicant respectfully submits that it should be patentable.

There is an absence of commercially available alternatives offering superior properties applicable to use in the fabrication of high quality roofing tiles or shingles.

While this is not to say that those formulations of the present application might not also offer substantial utility in other industries, it is important to note that such formulations were specifically developed for the advantages they impart to structural elements used as roofing tiles. When cast as roofing tiles none of the formulations cited by Rirsch, et al, Filteau, Bache, Copeland, Shutt et al, or Kosmatka et al offer superior or even equivalently high compression strength in conjunction with such high flexural strength in conjunction with such low bulk density and high resistance to water absorption.

As an experienced roofer, the applicant can attest to the fact that no commercially available flat tile of equivalent dimensions is as lightweight as those derived from the formulations described in the present application. Such a minimization of density clearly was not the intent of Filteau, Bache, Copeland, Kosmatka et al, or Shutt et al since each of these gentleman describe formulations for use in preparing building blocks or other weight bearing elements.

Even Rirsch et al, who perhaps come closest to suggesting a formulation that might be suitable for use as a roofing tile have taught a formulation which fails to overcome significant limitations to the amount (% by weight) of cellulosic fiber which can be incorporated into the set solid mixture from which lightweight structural elements might be derived without requiring a trade-off between strength and workability of the mixture before it is cast.

DETAILED DESCRIPTION

The structural building element described in this application can be made in accordance with the present method as follows: A wet mixture of cement, water, silica fume, ground cellulosic fiber, and ground expanded cellular polystyrene (Styrofoam) is formed. Air is preferably entrained therein during mixing and a wet structural unit, such as a roof tile is formed. Then the unit is oven dried at about 150° C. or air dried to a set, solid, lightweight, fireproof, high strength, thermally insulative product which preferably has a water content of substantially less than 25% by weight. Further features of the present unit and method are set forth in the following detailed description. Typical preferred compositions appear in Table II below:

TABLE II

| Ingredients | Weight % |
| --- | --- |
| Portland cement | about 30% to about 75% |
| Ground Expanded Cellular Polystyrene | about 1% to about 25% |
| Ground Cellulosic Fiber | about 1% to about 35% |
| Fly Ash | about 2% to about 15% |
| Silica Fume | about 1% to about 10% |
| Bentonite | about 1% to about 15% |
| Water | about 25% to about 50% |
| Rubber Emulsion | 0 to about 15% |
| Air Entrainer | 0 to about 3% |
| Wax Emulsion | 0 to about 10% |

EXAMPLE I

A wet cement mixture was made using the following ingredients and proportions set out below in Table III.

TABLE III

| Ingredients | Weight | Weight % |
| --- | --- | --- |
| Portland cement | 1712 g | 45.13% |
| Ground Expanded Cellular Polystyrene | 59.6 g | 1.57% |
| Ground Cellulosic Fiber | 79.4 g | 2.09% |
| Fly Ash | 249.5 g | 6.58% |
| Silica Fume | 127.6 g | 3.36% |
| Bentonite | 175.8 g | 4.63% |
| Rubber Emulsion (Styrene-Butadiene) | 309 g | 8.14% |
| Water | 1081 g | 28.49% |

The cement and fly ash were first mixed with 75% of the water plus the emulsion for 3 minutes. Then, the Styrofoam and paper were added with mixing for 2 minutes. Next, the bentonite was added with mixing for 1 minute. Then, the silica fume was added with mixing for 2 minutes. After the remainder of the water was added, the mixture was cast into the desired shape of a roof tile and oven dried at about 150° C. for 4 hours until the water content dropped below 30% by weight. The finished tile was lightweight, strong, fire resistant, and thermally insulative.

EXAMPLE II

The procedure of Example I was followed, except that the ingredients were as set out in Table IV.

TABLE IV

| Ingredients | Weight | Weight % |
| --- | --- | --- |
| Portland cement | 1071 g | 48.16% |
| Ground Expanded Cellular Polystyrene | 10 g | 0.45% |
| Ground Cellulosic Fiber | 50 g | 2.25% |
| Fly Ash | 157 g | 7.06% |
| Silica Fume | 78 g | 3.51% |
| Rubber Emulsion (Styrene-Butadiene) | 54 g | 2.43% |
| Air Entrainer | 4 g | 0.18% |
| Water | 800 g | 35.97% |

The specific gravity of the finished tile was 1.632 g/cc. The tile was strong, lightweight, fire resistant, and thermally insulative.

EXAMPLE III

A wet cement mixture was made using the following ingredients and proportions set out below in Table V. The wet mixture was then molded into the desired shape and the molded mixture was then solidified by air drying at about 150° F. until well set into a solid state.

TABLE V

| Ingredients | Weight | Weight % |
| --- | --- | --- |
| Portland cement | 1071 g | 49.18% |
| Ground Expanded Cellular Polystyrene | 10 g | 0.46% |
| Ground Cellulosic Fiber | 50 g | 2.30% |
| Fly Ash | 157 g | 7.21% |
| Silica Fume | 78 g | 3.58% |
| Bentonite | 54 g | 2.48% |
| Wax Emulsion | 7.5 g | 0.34% |
| Water | 750 g | 34.44% |
| Finished Product Density (g/cc) | | 1.289 |
| 7-Day Compression Strength (psi) | | 3209 |
| 7-Day Flexural Strength (psi) | | 318 |

EXAMPLE IV

A wet cement mixture was made using the following ingredients and proportions set out below in Table VI. The wet mixture was then molded into the desired shape and the molded mixture was then solidified by air drying at about 150° F. until well set into a solid state.

TABLE VI

| Ingredients | Weight | Weight % |
| --- | --- | --- |
| Portland cement | 600 g | 39.04% |
| Ground Expanded Cellular Polystyrene | 6 g | 0.39% |
| Ground Cellulosic Fiber | 69 g | 4.49% |
| Fly Ash | 88 g | 5.73% |
| Silica Fume | 44 g | 2.86% |
| Wax Emulsion | 30 g | 1.95% |
| Water | 700 g | 45.54% |
| Finished Product Density (g/cc) | | 1.350 |
| 7-Day Compression Strength (psi) | | 1145 |
| 7-Day Flexural Strength (psi) | | 205 |

EXAMPLE V

A wet cement mixture was made using the following ingredients and proportions set out below in Table VII. The wet mixture was then molded into the desired shape and the molded mixture was then solidified by air drying at about 150° F. until well set into a solid state.

TABLE VII

| Ingredients | Weight | Weight % |
|---|---|---|
| Portland cement | 600 g | 47.15% |
| Ground Expanded Cellular Polystyrene | 14 g | 1.10% |
| Ground Cellulosic Fiber | 28 g | 2.20% |
| Fly Ash | 88 g | 6.91% |
| Silica Fume | 44 g | 3.46% |
| Bentonite | 30 g | 2.36% |
| Rubber emulsion | 18 g | 1.42% |
| Air Entrainer | 0.6 g | 0.05% |
| Water | 450 g | 35.36% |
| Finished Product Density (g/cc) | | 1.235 |
| 7-Day Compression Strength (psi) | | n/a |
| 7-Day Flexural Strength (psi) | | 158 |
| 28-Day Flexural Strength (psi) | | 258 |

EXAMPLE VII

A wet cement mixture was made using the following ingredients and proportions set out below in Table VIII. The wet mixture was then molded into the desired shape and the molded mixture was then solidified by air drying at about 150° F. until well set into a solid state.

TABLE VIII

| Ingredients | Weight | Weight % |
|---|---|---|
| Portland cement | 1071 g | 50.52% |
| Ground Expanded Cellular Polystyrene | 10 g | 0.47% |
| Ground Cellulosic Fiber | 50 g | 2.36% |
| Fly Ash | 157 g | 7.41% |
| Silica Fume | 78 g | 3.68% |
| Bentonite | 54 g | 2.55% |
| Water | 700 g | 33.02% |
| Finished Product Density (g/cc) | | 1.327 |
| 7-Day Compression Strength (psi) | | n/a |
| 28-Day Compression Strength (psi) | | 1483 |
| 7-Day Flexural Strength (psi) | | n/a |
| 28-Day Flexural Strength (psi) | | 211 |

It will be understood that the tile or other structural unit of the present invention could be fabricated in any other suitable form and shape, so long as it comprises the ingredients specified herein. Various modifications, changes, alterations and additions can be made in the present structural unit, its components and parameters and in the present method, its steps and parameters. All such modifications, changes, alterations and additions as are within the scope of the appended claims form part of the present invention.

I claim:

1. Lightweight structural building units having a 7 day compressive strength of between 1096–3209 PSI, formed from a set solid mixture consisting essentially of about 30% to about 75% by weight Portland cement, about 1% to about 25% by weight ground expanded cellular polystyrene which has been finely ground as to yield a material wherein a single, broad and continuous size distribution of fractured cellular particles is homogeneously distributed throughout the unit to increase air entrainment capacity and provide a plurality of uniform air pockets therein, about 1% to about 35% ground cellulosic fiber, about 2% to about 15% by weight fly ash, about 1% to about 10% by weight silica fume, about 1% to about 15% by weight bentonite, about 25% to about 50% by weight water, about 0% to about 3% by weight air entrainer, about 0% to about 10% paraffin wax emulsion, and about 0% to about 15% by weight rubber emulsion wherein said paraffin wax emulsion increases the strength and reduces the susceptibility to absorb water after drying.

2. A lightweight structural unit according to claim 1 wherein the ground cellulosic fiber is obtained from recycled material.

3. A lightweight structural unit according to claim 1, having improved aesthetic consistency, maximum dimensional stability, increased structural integrity and a water content that remains below about 25%.

4. A lightweight structural unit according to claim 1 wherein said unit is a roofing shingle or roofing tile.

* * * * *